United States Patent
Kim et al.

(10) Patent No.: US 9,531,510 B2
(45) Date of Patent: Dec. 27, 2016

(54) METHOD FOR TRANSMITTING/RECEIVING SYNCHRONIZING SIGNAL IN WIRELESS COMMUNICATION SYSTEM AND DEVICE THEREFOR

(71) Applicant: LG ELECTRONICS INC., Seoul (KR)

(72) Inventors: Kitae Kim, Anyang-si (KR); Jinmin Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/440,049

(22) PCT Filed: Nov. 4, 2013

(86) PCT No.: PCT/KR2013/009887
§ 371 (c)(1),
(2) Date: Apr. 30, 2015

(87) PCT Pub. No.: WO2014/069951
PCT Pub. Date: May 8, 2014

(65) Prior Publication Data
US 2015/0296467 A1    Oct. 15, 2015

Related U.S. Application Data

(60) Provisional application No. 61/722,226, filed on Nov. 4, 2012, provisional application No. 61/722,228, filed on Nov. 4, 2012.

(51) Int. Cl.
*H04W 56/00* (2009.01)
*H04L 5/00* (2006.01)
(Continued)

(52) U.S. Cl.
CPC .............. *H04L 5/0016* (2013.01); *H04B 1/38* (2013.01); *H04L 5/001* (2013.01); *H04L 5/0048* (2013.01);
(Continued)

(58) Field of Classification Search
CPC ...... H04L 5/001; H04L 5/0016; H04L 5/0048; H04L 5/0092; H04L 27/2665; H04B 1/38; H04W 52/04; H04W 56/00; H04W 56/001; H04W 76/046
(Continued)

(56) References Cited

U.S. PATENT DOCUMENTS 9,065,630 B1    6/2015  Xiao et al.
9,258,825 B2 *  2/2016  Abe ...................... H04L 5/0023
(Continued)

FOREIGN PATENT DOCUMENTS

KR    10-2010-0096015    9/2010
KR    10-2011-0037430    4/2011
(Continued)

OTHER PUBLICATIONS

PCT International Application No. PCT/KR2013/009887, Written Opinion of The International Searching Authority dated Mar. 6, 2014, 32 pages.
(Continued)

*Primary Examiner* — Chi H Pham
*Assistant Examiner* — Robert Lopata
(74) *Attorney, Agent, or Firm* — Lee Hong Degerman Kang & Waimey

(57) ABSTRACT

The present invention relates to a wireless communication system. The method whereby a terminal receives a synchronizing signal in a wireless communication system according to one embodiment of the present invention may comprise the steps of: receiving location information on a domain,
(Continued)

from which the synchronizing signal is transmitted, among domains resulting from the division of the whole system bandwidth into N parts along a frequency axis and into M parts along a time axis (wherein N and M are natural numbers); and receiving the synchronizing signal from the domain corresponding to the location information.

12 Claims, 8 Drawing Sheets

(51) Int. Cl.
*H04B 1/38* (2015.01)
*H04W 52/04* (2009.01)
*H04L 27/26* (2006.01)
*H04W 76/04* (2009.01)

(52) U.S. Cl.
CPC ......... *H04L 5/0092* (2013.01); *H04L 27/2665* (2013.01); *H04W 52/04* (2013.01); *H04W 56/00* (2013.01); *H04W 56/001* (2013.01); *H04W 76/046* (2013.01)

(58) Field of Classification Search
USPC .......................................................... 370/330
See application file for complete search history.

(56) References Cited

U.S. PATENT DOCUMENTS

| | | | | |
|---|---|---|---|---|
| 2008/0002645 | A1* | 1/2008 | Seki | H04L 25/03834 370/338 |
| 2008/0039107 | A1 | 2/2008 | Ma et al. | |
| 2008/0089312 | A1* | 4/2008 | Malladi | H04L 5/005 370/345 |
| 2009/0103645 | A1* | 4/2009 | Jitsukawa | H04L 27/2607 375/260 |
| 2009/0129298 | A1* | 5/2009 | Luo | H04W 56/001 370/280 |
| 2011/0051749 | A1* | 3/2011 | Cheng | H04L 5/0048 370/480 |
| 2011/0069773 | A1* | 3/2011 | Doron | H04B 7/0417 375/267 |
| 2011/0158200 | A1* | 6/2011 | Bachu | H04L 5/0007 370/330 |
| 2011/0255486 | A1 | 10/2011 | Luo et al. | |
| 2011/0312319 | A1 | 12/2011 | Lindoff et al. | |
| 2012/0120903 | A1* | 5/2012 | Kim | H04B 7/024 370/329 |
| 2012/0163223 | A1* | 6/2012 | Lo | H04L 5/0007 370/252 |
| 2012/0188897 | A1* | 7/2012 | Shen | H04W 52/146 370/252 |
| 2013/0010715 | A1 | 1/2013 | Dinan | |
| 2013/0272263 | A1* | 10/2013 | Pi | H04W 72/042 370/330 |
| 2014/0105165 | A1* | 4/2014 | Dinan | H04L 27/2692 370/329 |
| 2014/0112243 | A1* | 4/2014 | Suzuki | H04W 56/00 370/328 |
| 2014/0120934 | A1* | 5/2014 | Kishiyama | H04W 76/023 455/452.1 |
| 2014/0169310 | A1* | 6/2014 | Ma | H04W 56/002 370/329 |
| 2014/0247808 | A1* | 9/2014 | Zhang | H04L 5/003 370/331 |
| 2015/0229453 | A1 | 8/2015 | Dai et al. | |

FOREIGN PATENT DOCUMENTS

| | | |
|---|---|---|
| KR | 10-2012-0088850 | 8/2012 |
| WO | 2010/002153 | 1/2010 |
| WO | 2010/032969 | 3/2010 |
| WO | 2010/090485 | 8/2010 |
| WO | 2011/013990 | 2/2011 |
| WO | 2012/077938 | 6/2012 |
| WO | 2012/148236 | 11/2012 |

OTHER PUBLICATIONS

PCT International Application No. PCT/KR2013/009888, Written Opinion of the International Searching Authority dated Mar. 6, 2014, 30 pages.
Manolakis, et al., "A Closed Concept for Synchronization and Cell Search in 3GPP LTE Systems," Wireless Communications and Networking Conference, XP031453985, Apr. 2009, 6 pages.
A. del Peral-Rosado, et al., "Achievable Localization Accuracy of the Positioning Reference Signal of 3GPP LTE," Localization and GNSS, XP032212258, Jun. 2012, 6 pages.
European Patent Office Application Serial No. 138516273, Search Report dated May 18, 2016, 7 pages.
United States Patent and Trademark Office U.S. Appl. No. 114/440,056, Office Action dated Sep. 23, 2016, 28 pages.

* cited by examiner

FIG. 8
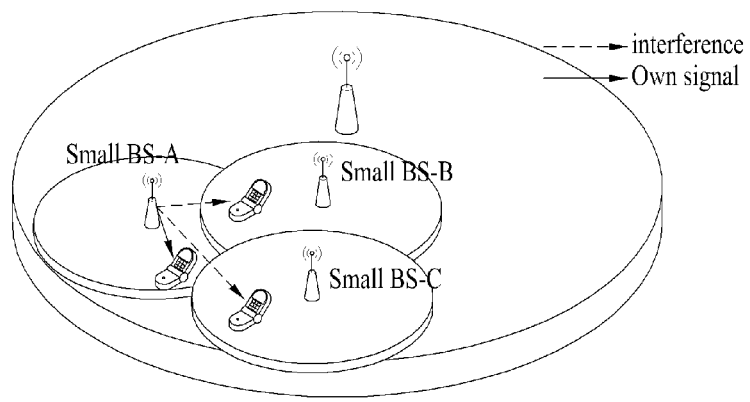
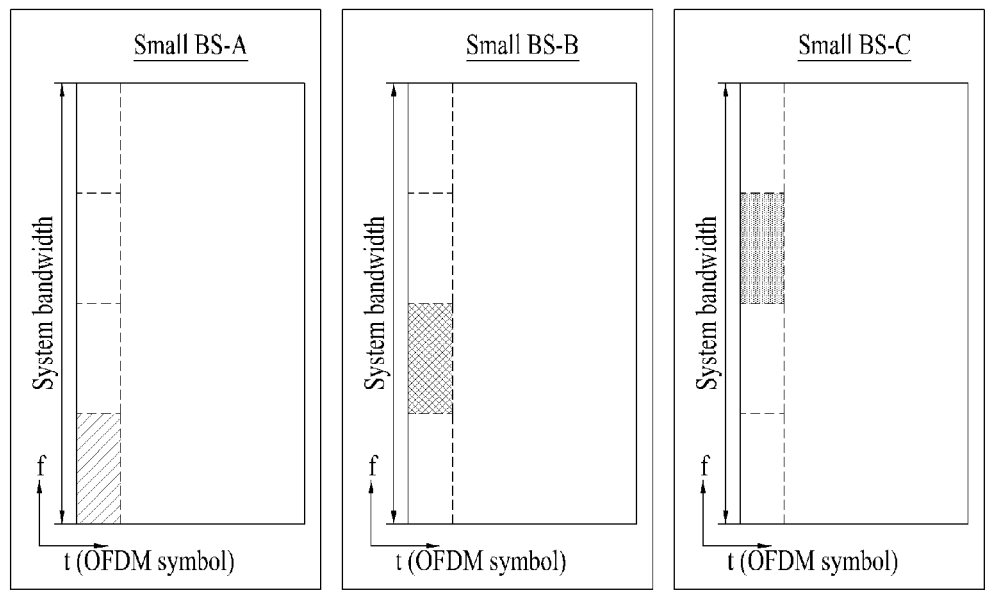

METHOD FOR TRANSMITTING/RECEIVING SYNCHRONIZING SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2013/009887, filed on Nov. 4, 2013, which claims the benefit of U.S. Provisional Application No. 61/722,226, filed on Nov. 4, 2012 and 61/722,228, filed on Nov. 4, 2012, the contents of which are all hereby incorporated by reference herein in their entirety.

TECHNICAL FIELD

The present invention relates to a wireless communication system and, more particularly, to a method of transmitting and receiving a synchronization signal in a wireless communication system, and an apparatus therefor.

BACKGROUND ART

A wireless communication system has been widely developed to provide various types of communication services such as voice, data, etc. In general, the wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi-carrier frequency division multiple access (MC-FDMA) system, etc.

DISCLOSURE

Technical Problem

An object of the present invention devised to solve the problem lies in a method of transmitting and receiving a synchronization signal in a wireless communication system, and an apparatus therefor.

Technical problems to be solved by the present invention are not limited to the above-mentioned technical problems, and other technical problems not mentioned herein may be clearly understood by those skilled in the art from description below.

Technical Solution

The object of the present invention can be achieved by providing a method of receiving a synchronization signal by a terminal in a wireless communication system, the method including receiving location information on a domain, from which the synchronization signal is transmitted, among domains obtained by dividing a whole system bandwidth into N parts along a frequency axis and into M parts along a time axis (wherein the numbers N and M are natural numbers), and receiving the synchronization signal from the domain corresponding to the location information.

In another aspect of the present invention, provided herein is a method of transmitting a synchronization signal by a base station in a wireless communication system, the method including transmitting location information on a domain, from which the synchronization signal is transmitted, among domains obtained by dividing a whole system bandwidth into N parts along a frequency axis and into M parts along a time axis (wherein the numbers N and M are natural numbers), and transmitting the synchronization signal from the domain corresponding to the location information.

In another aspect of the present invention, provided herein is a terminal receiving a synchronization signal in a wireless communication system, including a radio frequency (RF) unit, and a processor, wherein the processor is configured to receive location information on a domain, from which the synchronization signal is transmitted, among domains obtained by dividing a whole system bandwidth into N parts along a frequency axis and into M parts along a time axis (wherein the numbers N and M are natural numbers), and receive the synchronization signal from the domain corresponding to the location information.

In another aspect of the present invention, provided herein is a base station transmitting a synchronization signal in a wireless communication system, including an RF unit, and a processor, wherein the processor is configured to transmit location information on a domain, from which the synchronization signal is transmitted, among domains obtained by dividing a whole system bandwidth into N parts along a frequency axis and into M parts along a time axis (wherein the numbers N and M are natural numbers), and transmit the synchronization signal from the domain corresponding to the location information.

Items below may be commonly applied to embodiments of the present invention.

The synchronization signals transmitted from different base stations may be transmitted from domains having different frequency and time resources.

The synchronization signals transmitted from base stations which provide different types of services may be transmitted from domains having different frequency and time resources.

The number N may be determined based on a value obtained by normalizing transmission power of a base station connected to the terminal.

The number N may be set to a maximum size of fast Fourier transform (FFT).

The number N may be set to the number of subcarriers included in the whole system bandwidth.

Advantageous Effects

According to embodiments of the present invention, it is possible to more effectively transmit and receive a synchronization signal in a wireless communication system.

Effects that may be obtained from the present invention are not limited to the above-mentioned effects, and other effects not mentioned herein may be clearly understood by those skilled in the art from description below.

DESCRIPTION OF DRAWINGS

The accompanying drawings, which are included to provide a further understanding of the invention, illustrate embodiments of the invention and together with the description serve to explain the principle of the invention.

FIG. 8 is a diagram illustrating a fourth embodiment of allocating a synchronization signal based on inter-cell interference in the communication system according to the present invention.

BEST MODE

Figure 1:
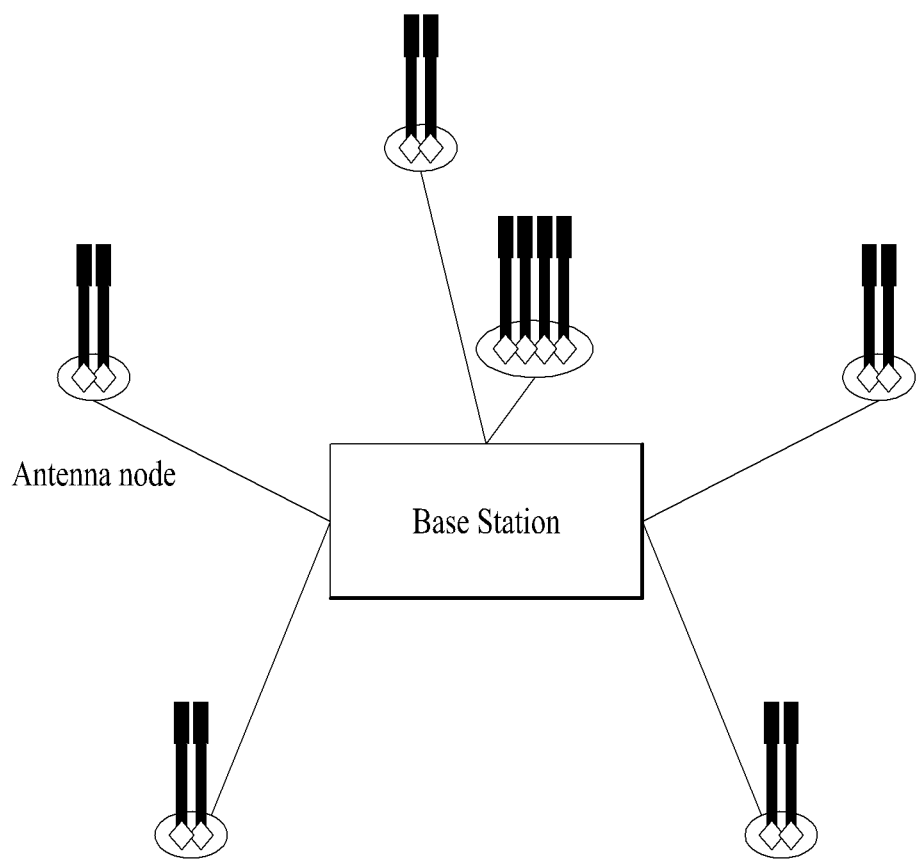
FIG. 1 is a diagram illustrating an example of a distributed antenna system (DAS).

The embodiments described below correspond to predetermined combinations of elements and characteristics of the present invention. Moreover, unless mentioned otherwise, the respective elements and characteristics may be considered optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in another embodiment of the present invention, or part of the configuration or characteristics of any one embodiment of the present invention may replace the respective configurations or characteristics of another embodiment of the present invention.

In this specification, embodiments of the present invention will be described by centering on a relation between data transmission and reception between a base station and a terminal. Here, the base station serves as a terminal node of a network which directly communicates with the terminal. In this document, a specific operation described as being performed by the base station may be performed by an upper node of the base station in some cases.

In other words, in a network including a plurality of network nodes including the base station, it is clear that various operations performed for communication with the terminal may be performed by the base station or other network nodes than the base station. The term "base station (BS)" may be replaced by the terms fixed station, Node B, eNode B, access point (AP), etc. The term "repeater" may be replaced by the terms relay node (RN), relay station (RS), etc. In addition, the term "terminal" may be replaced by the terms user equipment (UE), mobile station (MS), mobile subscriber station (MSS), subscriber station (SS), etc.

The specific terms used in the following description of the present invention are provided to facilitate the understanding of the present invention. Therefore, without deviating from the technical spirit of the present invention, such specific terms may also be changed to other terms.

In some cases, in order to avoid any ambiguity in the concept of the present invention, some known structures and devices may be omitted, or the present invention may be illustrated in the form of a block diagram focusing on the essential functions of each structure and device. Furthermore, throughout the entire description of the present invention, the same reference numerals will be used for the same elements of the present invention.

The embodiments of the present invention may be supported by at least one the disclosed standard documents for wireless access systems including Institute of Electrical and Electronics Engineers (IEEE) 802, 3rd generation partnership project (3GPP), 3GPP long term evolution (LTE), LTE-advanced (LTE-A), and 3GPP2. In other words, among the embodiments of the present invention, partial operation steps or structures of the present invention, which have been omitted from the description of the present invention in order to clarify the technical spirit of the present invention may also be supported by the above-described standard documents. Furthermore, the terms disclosed in the description of the present invention may be described based upon the above-mentioned standard documents.

The technology described below may be used in a wide range of wireless access systems, such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be realized by radio technology such as universal terrestrial radio access (UTRA) or CDMA2000. TDMA may be realized by radio technology such as global system for mobile communications (GSM)/general packet radio service (GPRS)/enhanced data rates for GSM evolution (EDGE). OFDMA may be realized by a radio technology such as IEEE 802.11 (Wi-Fi), IEEE 802.16 (WiMAX), IEEE 802-20, evolved UTRA (E-UTRA), etc. UTRA corresponds to a portion of the universal mobile telecommunications system (UMTS). As a portion of evolved UMTS (E-UMTS) using E-UTRA, the 3GPP LTE system adopts OFDMA on downlink and adopts SC-FDMA on uplink. LTE-A has evolved from 3GPP LTE. WiMAX may be described based upon the IEEE 802.16e standard (WirelessMAN-OFDMA Reference System) and the evolved IEEE 802.16m standard (WirelessMAN-OFDMA Advanced system). For clarity, in the description of the present invention, the present invention will be described based upon 3GPP LTE and 3GPP LTE-A. Nevertheless, the technical spirit of the present invention is not limited to 3GPP LTE and 3GPP LTE-A.

A distributed antenna system (DAS) will be described with reference to FIG. 1.

In a current wireless communication environment, the amount of data required has rapidly increased due to introduction of Machine-to-Machine (M2M) communication and proliferation of various devices such as a smartphone, a tablet PC, etc., which require high data transmission capacities. To satisfy demand for large data capacity, communication technology is being developed toward a carrier aggregation (CA) technology for efficient use of more frequency bands, multi-antenna and coordinated multi-point technologies for increasing a data capacity within a limited frequency, etc. A communication environment is evolving toward increasing the density of APs accessible to users. An AP may increase a data capacity through several APs having small coverage areas such as a Wi-Fi AP, a cellular femto AP, a cellular pico AP, etc. in addition to a cellular macro AP. The AP may take the form of a remote radio head (RRH), an antenna node of the DAS, etc.

Unlike a centralized antenna system (CAS) in which antennas of base stations (BS, base transceiver station (BTS), Node-B, and eNode-B) are close to each other at a center of a cell, the DAS manages antennas distributed in various positions in a cell by a single base station. The DAS is distinguished from a femto/pico cell in that several antenna nodes form one cell. Initially, the DAS has been used to further install antennas in order to cover a shadow area. However, the DAS may be regarded as a type of multiple-input multiple-output (MIMO) system in that base station antennas may support one or several users by simultaneously transmitting and receiving several data streams. The MIMO system is regarded as an essential for satisfying a requirement of next generation communication due to high frequency efficiency (spectral efficiency). For the MIMO system, the DAS is advantageous over the CAS in terms of high power efficiency obtained when a distance between a user and an antenna decreases, a high channel capacity due to low correlation between base station antennas and low interference, communication performance having a relatively uniform quality irrespective of a location of a user in a cell, etc.

FIG. 1 illustrates an example of the DAS. As illustrated in FIG. 1, the DAS includes a base station and antenna nodes (a group, a cluster, etc.) connected to the base station. An antenna node is connected to the base station by wire or wirelessly. In addition, the antenna node may include one or a plurality of antennas. In general, antennas included in one antenna node are spaced apart from each other by several meters or farther and regionally included in the same spot. The antenna node functions as an access point accessible by a terminal. In an existing DAS, the antenna node is identified with or is not distinguished from the antenna. However, a relation between the antenna node and the antenna needs to be clearly defined to operate the DAS.

Figure 2:
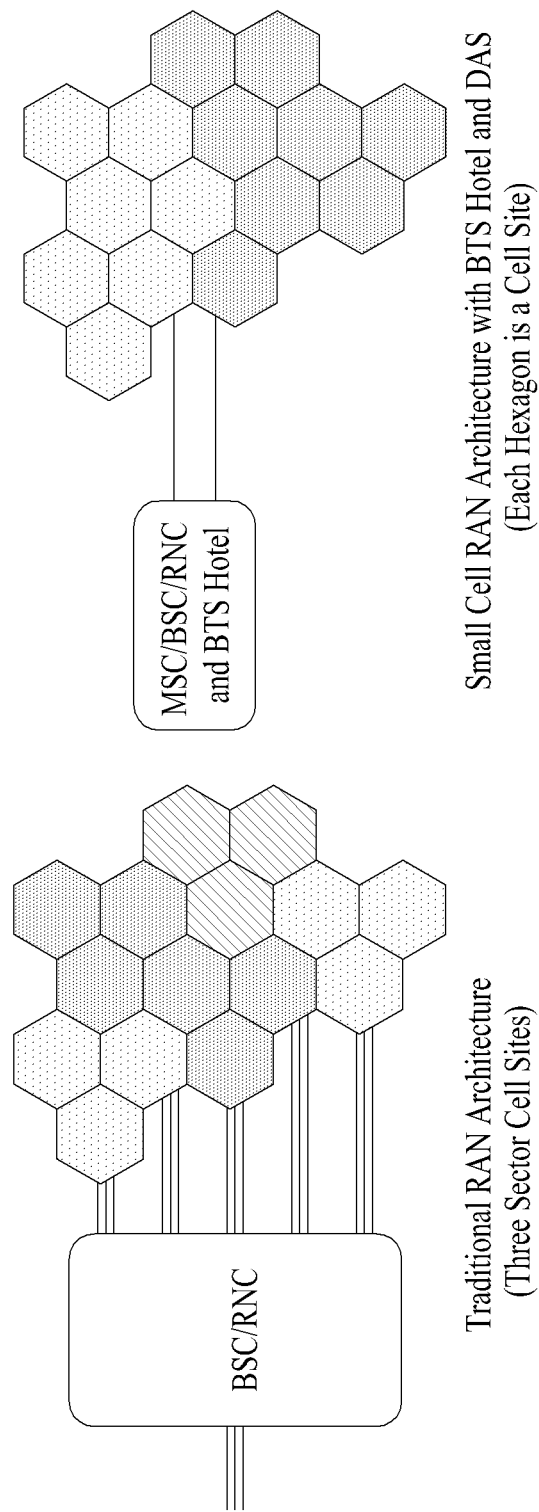
FIG. 2 is a diagram illustrating a concept of a base transceiver station (BTS) hotel of the DAS.

FIG. 2 illustrates a concept of a BTS hotel of the DAS. Referring to FIG. 2, in an existing cellular system, one BTS controls three sectors, and each base station is connected to a base station controller (BSC)/radio network controller (RNC) through a backbone network. However, in the DAS, base stations connected to each antenna node may be gathered in one place (BTS hotel). In this way, it is possible to reduce costs for land and building for installation of the base stations, and to maintain and manage the base stations at one place. In addition, it is possible to greatly increase a backhaul capacity by installing the BTS and a mobile switching center (MSC)/BSC/RNC at one place.

A structure of a radio frame will be described with reference to FIG. 3.

In a cellular OFDM radio packet communication system, uplink/downlink data packet transmission is performed in subframe units, and once subframe is defined as a predetermined time period (or time section) including multiple OFDM symbols. The 3GPP LTE standard supports a Type 1 radio frame structure, which is applicable to FDD (Frequency Division Duplex), and a Type 2 radio frame structure, which is applicable to TDD (Time Division Duplex).

Figure 3:
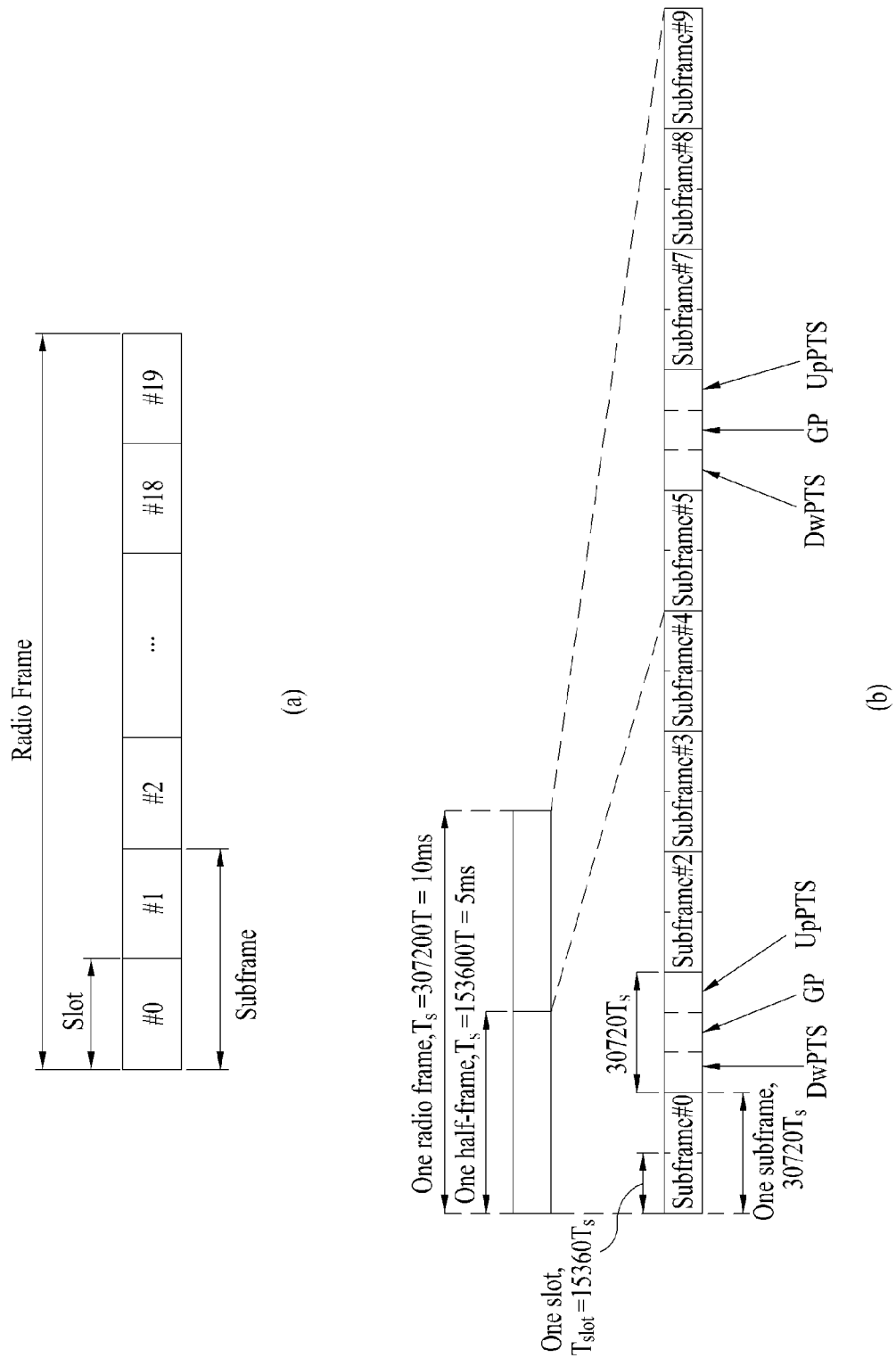
FIG. 3 is a diagram illustrating an example of a structure of a radio frame.

(a) of FIG. 3 illustrates an exemplary structure of a type 1 radio frame. A downlink radio (or wireless) frame is configured of 10 subframes, and one subframe is configured of 2 slots in a time domain. The time consumed (or taken) for one subframe to be transmitted is referred to as a TTI (transmission time interval). For example, the length of one subframe may be equal to 1 ms, and the length of one slot may be equal to 0.5 ms. One slot includes a plurality of OFDM (orthogonal frequency division multiplexing) symbols in the time domain and includes a plurality of Resource Blocks (RBs) in the frequency domain. Since the 3GPP LTE uses the OFDMA in a downlink, an OFDM symbol is used to indicate one symbol section. The OFDM symbol may also be referred to as an SC-FDMA symbol or a symbol section. As a resource allocation unit, a Resource Block (RB) may include a plurality of consecutive subcarriers in one slot.

The number of OFDM symbols included in one slot may vary depending upon the configuration of a CP (Cyclic Prefix). The CP may be divided into an extended CP and a normal CP. For example, in case the OFDM symbol is configured of a normal CP, the number of OFDM symbols included in one slot may be equal to 7. And, in case the OFDM symbol is configured of an extended CP, since the length of an OFDM symbol is increased, the number of OFDM symbols included in one slot becomes smaller than when the OFDM symbol is configured of a normal CP. In case of the extended CP, for example, the number of OFDM symbols included in one slot may be equal to 6. In case the user equipment is moving at high speed, or in case the channel status is unstable, the extended CP may be used in order to further reduce the interference between the symbols.

In case of using the normal CP, since one slot includes 7 OFDM symbols, one subframe includes 14 OFDM symbols. At this point, the first maximum of 3 OFDM symbols of each subframe are allocated to a PDCCH (physical downlink control channel), and the remaining OFDM symbols may be allocated to a PDSCH (physical downlink shared channel).

(b) of FIG. 3 illustrates an exemplary structure of a type 2 radio frame. The type 2 radio frame consists of 2 half frames, and each half frame is configured of 5 general subframes and a DwPTS (Downlink Pilot Time Slot), a Guard Period (GP), and a UpPTS (Uplink Pilot Time Slot), wherein 1 subframe is configured of 2 slots. The DwPTS is used for performing initial cell search, synchronization or channel estimation in the user equipment. And, the UpPTS is used for matching a channel estimation performed in the based station with an uplink transmission synchronization performed in the user equipment. The guard period refers to a period for eliminating (or removing) interference that occurs in an uplink, due to a multiple path delay of a downlink signal between an uplink and a downlink.

The structure of the radio frame is merely an example. The number of subframes included in a radio frame, the number of slots included in a subframe, or the number of symbols included in a slot may be variously changed.

Figure 4:
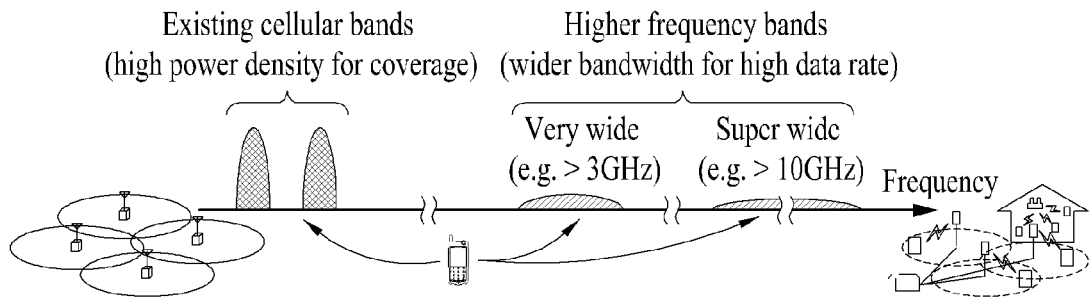
FIG. 4 is a diagram illustrating an example of a frequency bandwidth of legacy communication and a frequency bandwidth of a small cell.

FIG. 4 illustrates an example of a frequency bandwidth of legacy communication and a frequency bandwidth of a small cell.

A concept of a local area is introduced to satisfy a large amount of data transfer of next generation communication. In other words, local area access corresponding to a new cell deployment is required to reinforce service support for each user.

FIG. 4 illustrates a concept of a small cell according to the new cell deployment. In other words, a network may configure and operate a wide system band in a band having a high center frequency rather than a frequency band operated in a legacy LTE system for a terminal. In addition, it is possible to support basic cell coverage based on a control signal such as system information through an existing cellular band, and maximize transmission efficiency using a wider frequency band in a small cell of a high frequency. Therefore, local area access is targeted to a terminal having low-to-medium mobility located in a relatively small area. A distance between the terminal and the base station may be set to a smaller cell of hundreds of meters than an existing cell of several kilometers.

In such cell, the distance between the terminal and the base station decreases, and a high-frequency band is used. Thus, channel characteristics below may be expected.

Delay spread: As the distance between the base station and the terminal decreases, delay of a signal may decrease.

Subcarrier spacing: When an OFDM-based frame similar to LTE is applied, an allocated frequency band is great, and thus a value may be set to an extremely large value which is greater than existing 15 KHz.

Doppler frequency: A high Doppler frequency occurs in a high-frequency band when compared to a low frequency band, and thus coherent time may be dramatically shortened.

This specification proposes a scheme of transmitting a synchronization signal for high-frequency band transmission, and describes various embodiments based on characteristics of the high-frequency band.

In general, delay spread of a channel decreases in a high-frequency band in which a carrier frequency is 5 GHz or more. In addition, in the high-frequency band, path loss of the channel greatly increases, and thus stable performance may be ensured when a distance to the base station is short. Therefore, it is preferable to use a smaller cell structure in communication using the high-frequency band when compared to existing cellular communication, and use OFDM corresponding to a multiple access scheme for resource utilization and ease of control.

When the channel characteristic is considered, an existing synchronization signal based on a single symbol/single sequence such as in LTE may not provide sufficient performance. Therefore, hereinafter, a description will be given of considerations for transmission of the synchronization signal in the high-frequency band.

First, increase in center frequency of a service band needs to be considered.

A center frequency band of 5 GHz or more or several GHz or more may be used instead of a channel environment of 5 GHz or less in which the existing cellular system or a Wi-Fi system is operates because an available wide frequency band may not be ensured around 2 GHz. A frequency band used for existing communication entails difficulties in alteration of use and utilization due to several restrictions.

Second, a wide system bandwidth is required.

Next generation communication is required to support not only an existing full high definition (HD)-based service but also an ultra definition (UD)-class service or more. Therefore, a service needs to be provided using a wider bandwidth in order to support a high transfer rate. Here, when a service is provided using a bandwidth of hundreds of MHz or more or several GHz or more, it is inefficient to transmit the synchronization signal in a whole frequency band because power consumption is great when the synchronization signal is transmitted in a whole widened system bandwidth.

Lastly, high-density cell deployment based on a small cell is required.

High-density deployment of a small cell is efficient in high-frequency band communication. This scheme is the most efficient scheme for supporting a high transfer rate, and may maximize a capacity of the entire system through denser cell deployment. However, when the synchronization signal is transmitted in a band of several GHz in a small cell in which transmission power of the base station is low, quality of the synchronization signal received by the terminal may be degraded, and thus performance of acquiring synchronization may be degraded.

Hereinafter, embodiments below will be proposed based on the three characteristics of high-frequency band communication.

First Embodiment

According to a first embodiment of the present invention, a base station may transmit a synchronization signal in a part of a system bandwidth of high-frequency band communication. However, a location of the synchronization signal is not restricted to a middle point of the system bandwidth, that is, a domain on which a direct current (DC) subcarrier is transmitted.

Figure 5:
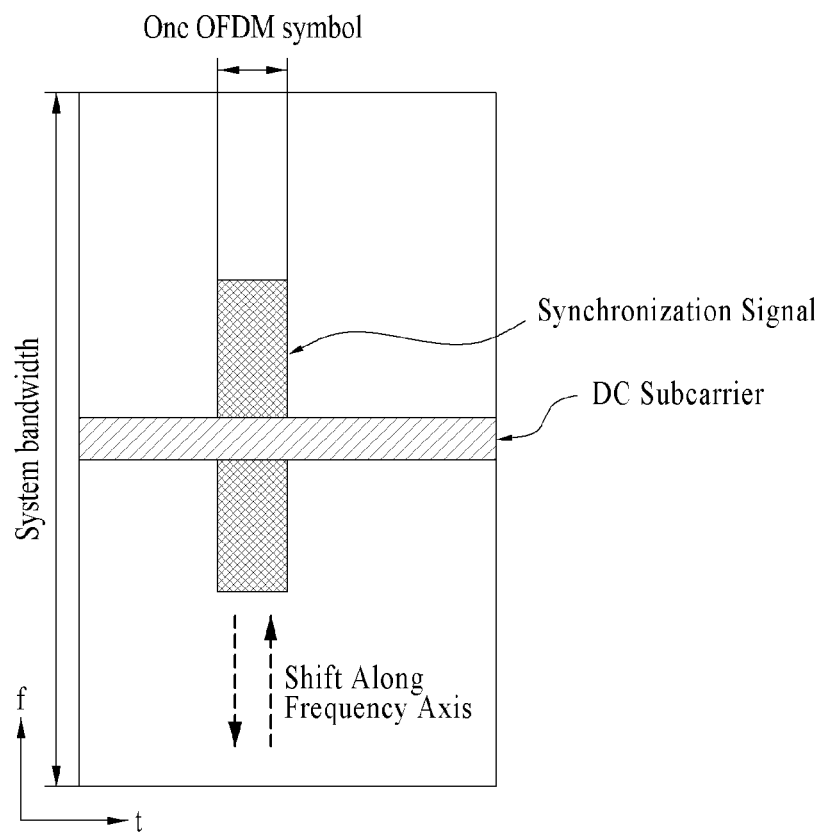
FIG. 5 is a diagram illustrating a first embodiment of allocating a synchronization signal in a communication system according to the present invention.

FIG. 5 illustrates the first embodiment in which the synchronization signal is allocated in a high-frequency band communication system.

Referring to FIG. 5, a location from which the synchronization signal is allocated may be a middle point of a whole system bandwidth and be shifted to another domain. The synchronization signal is transmitted with high power when compared to a general data signal so as to be easily detected. Therefore, the synchronization signal may interfere with or be interfered by a terminal that accesses a particular base station. In this case, a transmission domain of the synchronization signal may be changed differently between base stations.

The base station may transmit information about a location from which the synchronization signal is transmitted. For example, information about a location of a synchronization signal of a secondary cell may be transmitted through radio resource control (RRC) signaling of a primary cell in a system that supports CA. When the location of the synchronization signal is transmitted as bitmap information, a location of a synchronization signal channel may be indicated by the number of subcarriers, that is, $\lceil \log_2 N_{FFT} \rceil$. When a size of fast Fourier transform (FFT) is 1024, a total of 10 bits is required. In a stand-alone system, the terminal may perform blind search to detect all candidates for the synchronization signal in a whole band.

Second Embodiment

According to a second embodiment, a base station may transmit a synchronization signal in a plurality of domains obtained by dividing a whole frequency band.

Figure 6:
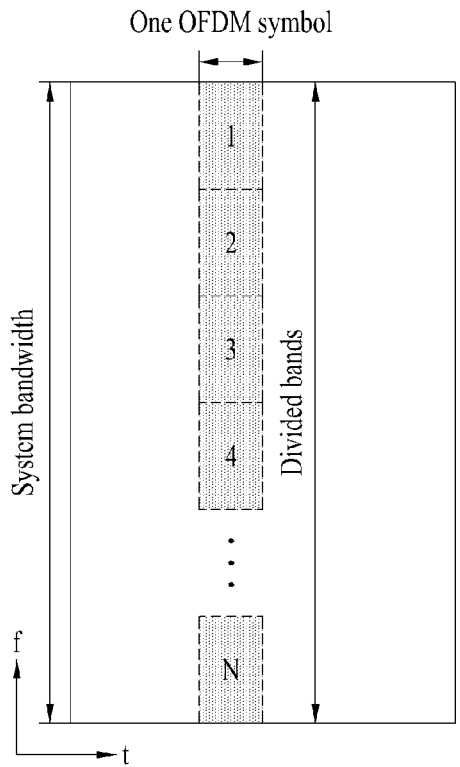
FIG. 6 is a diagram illustrating a second embodiment of dividing a whole system bandwidth into N parts in the communication system according to the present invention.

FIG. 6 illustrates the second embodiment in which the whole frequency band is divided into N bands in a communication system according to the present invention.

Referring to FIG. 6, the whole frequency band is divided into N domains (N being a natural number). In this instance, the base station may transmit the synchronization signal by selecting one domain or M (1≤M≤N) domains among the divided domains.

An object of a high-frequency band communication system is to acquire a high transfer rate using a wide system bandwidth. In this instance, when the synchronization signal is transmitted in the whole frequency band, a terminal needs to detect the synchronization signal in the whole frequency band without a filtering process. As a result, complexity of the terminal increases, and the synchronization signal may not be rapidly detected.

Therefore, according to the second embodiment of the present invention, a frequency band is divided into N domains, and the synchronization signal is transmitted in M domains corresponding to a part of the divided domains, thereby allowing the terminal to rapidly detect the synchronization signal. When complexity of the terminal is not greatly affected, the synchronization signal may be transmitted in a whole band by setting M to N. The number N of the divided bands may be set to a maximum size of FFT or the number of available subcarriers. A maximum value of N corresponds to the number of divided bands obtained by dividing the whole frequency band using a subcarrier as a unit. In addition, N may be determined according to a level of normalized transmission power. The number N of the divided frequency bands may be transmitted to the terminal through RRC signaling.

A location from which the synchronization signal is transmitted may be transmitted as bitmap information. When the number N of the divided frequency bands is 10, information about the location from which the synchronization signal is transmitted may be configured as Table 1 by setting $\lceil \log_2 N \rceil$ to 4 bits.

TABLE 1

| Location of synchronization signal | Bit information |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

In addition, Table 2 may be configured by a one-to-one correspondence between frequency bands and 10 respective bits in total.

TABLE 2

| Location of synchronization signal | Bit information |
|---|---|
| 0 | 0000000001 |
| 1 | 0000000010 |
| 2 | 0000000100 |
| 3 | 0000001000 |
| 4 | 0000010000 |
| 5 | 0000100000 |
| 6 | 0001000000 |
| 7 | 0010000000 |
| 8 | 0100000000 |
| 9 | 1000000000 |

The location from which the synchronization signal is transmitted may be predefined or transmitted to the terminal through RRC signaling, etc. Alternatively, the terminal may detect the synchronization signal through blind search. The information about the location from which the synchronization signal is transmitted may be transmitted or blind search may be determined based on processing capability and complexity of the terminal or a channel environment factor such as interference, etc. For example, in a system that supports CA, information about a location of a synchronization signal of a secondary cell may be transmitted through RRC signaling of a primary cell.

Third Embodiment

Figure 7:
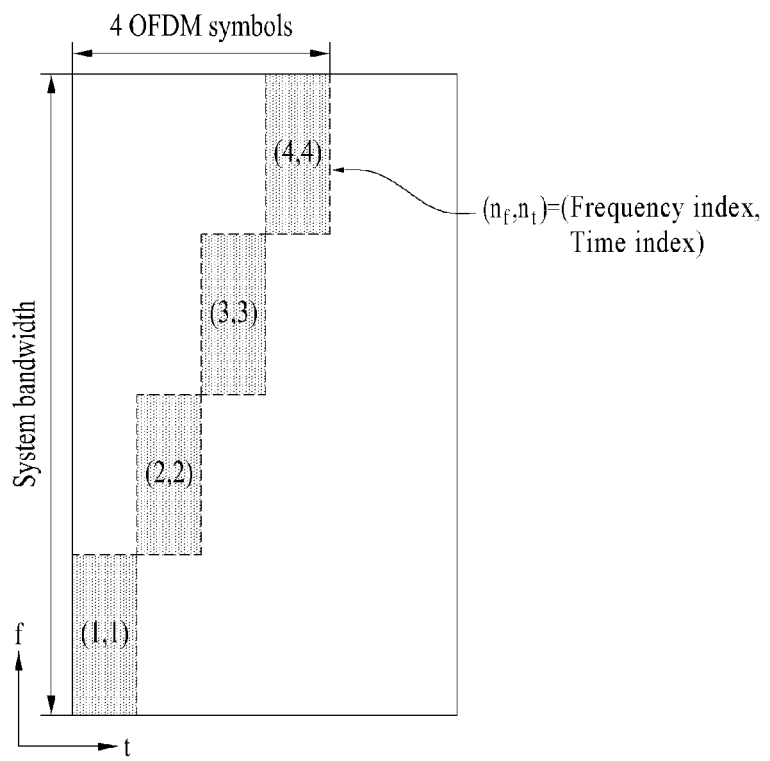
FIG. 7 is a diagram illustrating a third embodiment of dividing a system band based on both time and frequency in the communication system according to the present invention.

FIG. 7 illustrates a third embodiment in which a whole system bandwidth is divided based on time and frequency and a synchronization signal is transmitted in a divided domain.

Referring to FIG. 7, various combinations may be created using a time-frequency pattern. In the second embodiment, a frequency domain is divided on a constant time domain. However, according to the third embodiment, the system band may be divided based both on time and frequency.

For example, when the whole system bandwidth is divided into N frequency domains, and M symbols are used to transmit the synchronization signal in a time domain (here, N and M being natural numbers), the total number of combinations may be expressed by Equation 1 below. In this instance, the M of symbols for transmission of the synchronization signal may be contiguous or noncontiguous in the time domain. FIG. 7 illustrates a case in which a frequency domain is divided into four domains and four symbols are selected in the time domain.

The number of bands selected in the frequency domain:
$N_f = \sum_{n=1}^{N} {}_N C_n$ The number of symbols selected in the time domain:
$N_t = \sum_{m=1}^{M} {}_M C_m$ The number of candidates for a whole band on which the synchronization signal is transmitted: $N_f \times N_t$ Information about a location from which the synchronization signal is transmitted may be transmitted as bitmap information after indexing coordinate information or a whole domain. Alternatively, the information about the location from which the synchronization signal is transmitted may be transmitted to a terminal through RRC signaling, etc. or predefined. Alternatively, the terminal may detect the synchronization signal through blind search. The information about the location from which the synchronization signal is transmitted may be transmitted or blind search may be determined based on processing capability and complexity of the terminal or a channel environment factor such as interference, etc. For example, in a system that supports CA, information about a location of a synchronization signal of a secondary cell may be transmitted through RRC signaling of a primary cell.

Fourth Embodiment

As described in the foregoing, a high-frequency band communication system is expected to use high-density cell deployment based on a small cell. In this case, when all base stations transmit synchronization signals in the same time-frequency domain, synchronization signals including different sequences may greatly interfere with each other. This may cause an error when a terminal acquires initial synchronization and acquires neighbor cell synchronization such as handover, etc. Therefore, the fourth embodiment of the present invention describes a method of configuring a synchronization signal differently between base stations based on an interference condition of the terminal. The method of configuring the synchronization signal in different time-frequency domain resources for respective base stations may be predefined or performed through RRC signaling.

For example, when service coverage areas of adjacent small cells overlap under a circumstance in which various networks are included in a service coverage area of the terminal as in FIG. 8, the synchronization signal may be transmitted through different domains for respective base stations by managing the networks. In this way, it is possible to greatly reduce interference occurring between synchronization signals in high-density deployment of the small cells. In addition, a resource allocation pattern of the synchronization signal may be changed by updating interference condition information of each cell. Further, this concept may be applied by varying resource allocation depending on service type of a base station (macro, pico, femto, RRH, relay, hotspot, etc.).

Fifth Embodiment

A fifth embodiment of the present invention describes a method of transmitting synchronization signals on different time-frequency resource domains for respective carriers in a system using multiple carriers.

A next generation communication system may employ a multi-carrier operation scheme using aggregated bands having a certain size or more in addition to a single broadband. An available bandwidth is restricted for each center frequency band, and thus it is difficult to allocate a bandwidth of several GHz or more at a time. Therefore, it is preferable to construct a system based on multiple carriers by joining bands having a certain size or more.

Examples of the system based on multiple carriers may include an LTE-A system. The LTE-A system employs CA technology to aggregate and transmit a plurality of component carriers, thereby enhancing a transmission bandwidth of a terminal and increasing frequency use efficiency. The LTE-A system may extend a bandwidth up to 100 MHz by simultaneously using a plurality of carriers (multiple carriers) together rather than a single carrier which has been used in LTE rel 8/9. In other words, a carrier, which has been defined as a maximum of 20 MHz in legacy LTE rel 8/9, is redefined as a component carrier, and one terminal is allowed to use a maximum of five component carriers through the CA technology.

Currently, the CA technology mainly has characteristics below.

(1) Aggregation of contiguous component carriers is supported, and aggregation of noncontiguous component carriers is supported.

(2) The number of carrier aggregations may be different between uplink and downlink. When the technology needs to be compatible with an existing system, uplink and downlink need to configure the same number of component carriers.

(3) Different transmission bandwidths may be acquired by configuring different numbers of component carriers between uplink and downlink.

(4) For a terminal, each component carrier independently transmits one transport block, and has an independent hybrid automatic repeat request (HARQ) mechanism.

Unlike a legacy LTE system using one component carrier, CA which uses a plurality of component carriers requires a method of effectively managing the component carriers. To efficiently manage the component carriers, the component carriers may be classified according to functions and characteristics. The component carriers may be classified into a primary component carrier (PCC) and secondary component carriers (SCCs). The PCC functions as a core component carrier for management of component carriers when several component carriers are used, and one PCC is defined for each terminal.

In addition, other component carriers except for the one PCC are defined as the SCCs. The PCC may function as a core carrier that manages all aggregated component carriers, and the other SCCs may function as additional frequency resource providers to provide a high transfer rate. For example, a base station may perform connection (RRC connection) for signaling with respect to a terminal through the PCC. Security and information for an upper layer may be provided through the PCC. In reality, when only one component carrier is present, the component carrier may correspond to the PCC. In this instance, the component carrier may function similarly to a carrier of the legacy LTE system.

The fifth embodiment of the present invention describes a method of transmitting synchronization signals through different time-frequency domains for respective carriers in a system using multiple carriers.

First, different frequency bands are allocated for respective carriers based on one base station, and other base stations are configured such that allocated patterns do not overlap or overlap at a particular distance or more. In this way, it is possible to greatly decrease a possibility that synchronization signal interference occurs between base stations.

For example, as shown in Table 3, when the number of candidates for a time-frequency domain is four (N=4), the number of multiple carriers is three (M=3), and the number of overlapping base stations is four (L=4), combinations below may be created.

TABLE 3

| Synchronizing | Multiple carriers | | |
| --- | --- | --- | --- |
| signal resource | F1 band | F2 band | F3 band |
| Base station 1 | Index 0 | Index 1 | Index 2 |
| Base station 2 | Index 1 | Index 2 | Index 3 |
| Base station 3 | Index 2 | Index 3 | Index 0 |
| Base station 4 | Index 3 | Index 0 | Index 1 |

Figure 9:
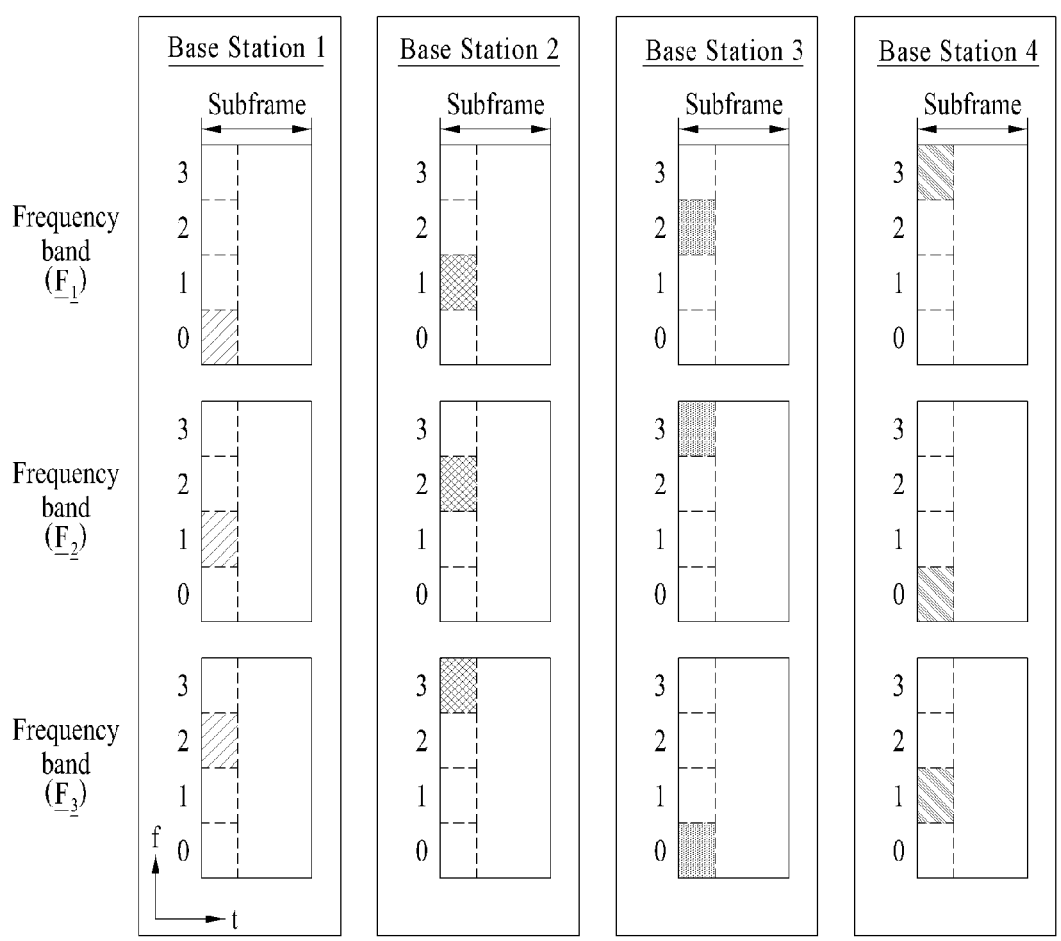
FIG. 9 is a diagram illustrating a fifth embodiment of allocating different resources to respective carriers of multiple carriers in the communication system according to the present invention.

FIG. 9 illustrates an example of synchronization signal allocation according to the fifth embodiment of the present invention and, more particularly, illustrates synchronization signal allocation according to Table 3. Referring to FIG. 9, it can be understood that four partial bands in total are present in a frequency band, and 0 to 3 are supported as resource allocation indices.

Information about a location from which a synchronization signal is transmitted may be transmitted to a terminal through RRC signaling, etc. or predefined. Alternatively, the terminal may detect the synchronization signal through blind search. The information about the location from which the synchronization signal is transmitted may be transmitted or blind search may be determined based on processing capability and complexity of the terminal or a channel environment factor such as interference, etc. For example, in a system that supports CA, information about a location of a synchronization signal of a secondary cell may be transmitted through RRC signaling of a primary cell.

Sixth Embodiment

The first to fifth embodiments define resources for transmission of synchronization signals. The sixth embodiment defines an actually transmitted synchronization signal, that is, a sequence when a frequency-time resource for transmission of a synchronization signal is determined.

Figure 10:
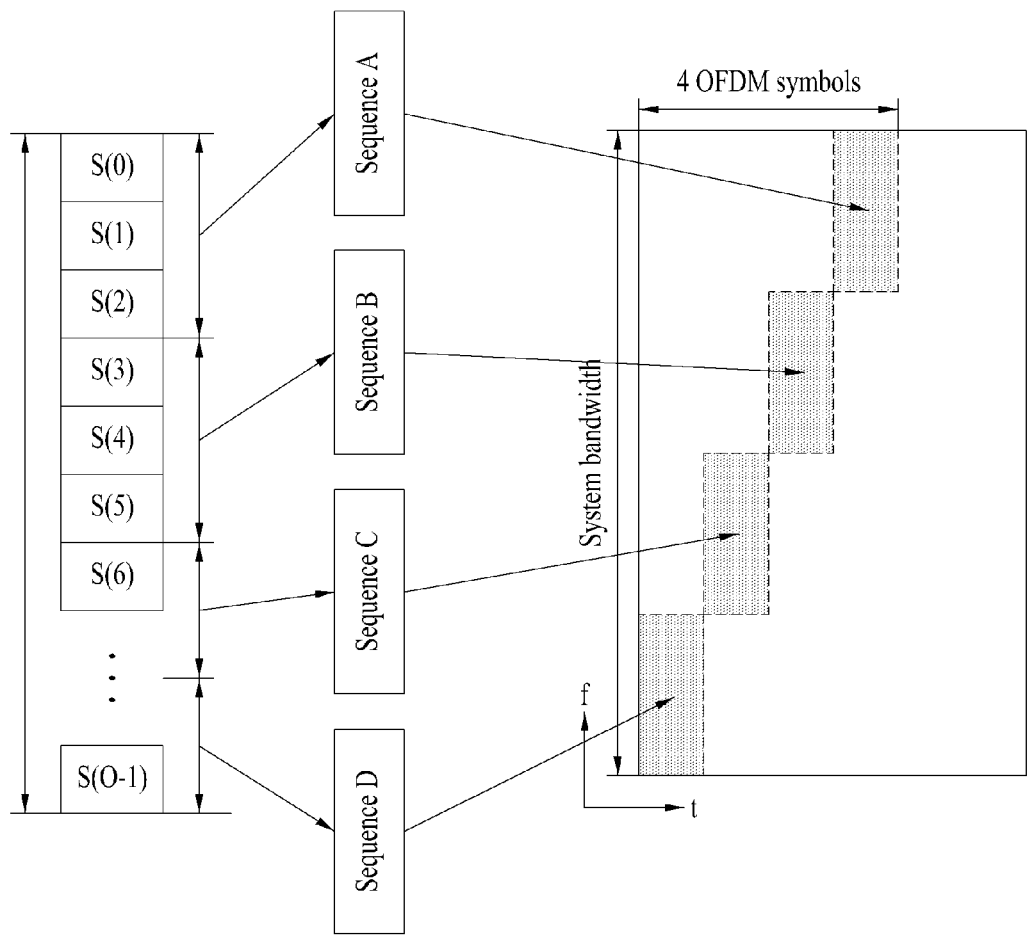
FIG. 10 is a diagram illustrating an example of dividing and transmitting a synchronization sequence in the communication system according to the present invention.

According to the first to third embodiments, a synchronization signal may be transmitted in some of domains obtained by dividing a whole system bandwidth with respect to frequency or time. Here, basically, the same synchronization sequence may be actually mapped to the respective domains. However, it is possible to configure different synchronization sequences for the respective domains. In addition, when different synchronization sequences are configured for the respective domains, one synchronization sequence having a length of the whole frequency band may be designed, and then the synchronization sequence may be divided and transmitted according to lengths of the respective domains as illustrated in FIG. 10.

Figure 11:
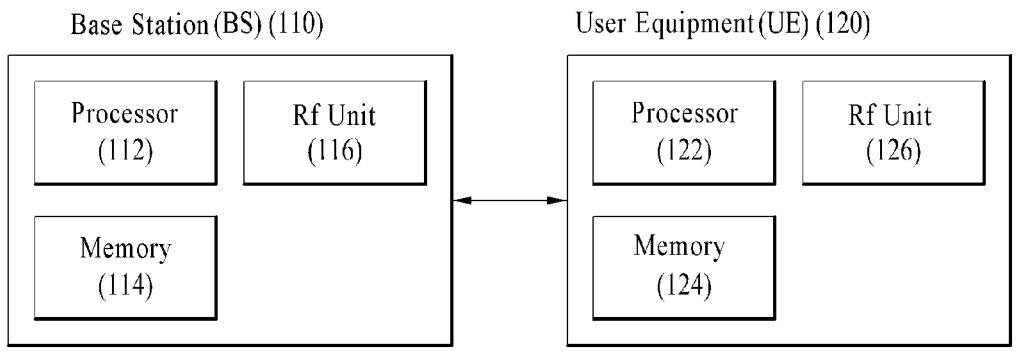
FIG. 11 is a block diagram illustrating an example of a base station and a terminal applicable to an embodiment of the present invention.

Base Station and Terminal to which an Embodiment of the Present Invention May be Applied FIG. 11 illustrates a base station 110 and a terminal 120 to which an embodiment of the present invention may be applied.

When a relay is included in a wireless communication system, communication is performed between the base station 110 and the relay in a backhaul link, and communication is performed between the relay and the terminal 120 in an access link. Therefore, the base station 110 or the terminal 120 illustrated in the figure may be replaced by the relay as needed.

Referring to FIG. 11, the wireless communication system includes the base station 110 and the terminal (or UE) 120. The base station 110 includes a processor 112, a memory 114, and a radio frequency (RF) unit 116. The processor 112 may be configured to implement a procedure and/or a method proposed by the present invention. The memory 114 is connected to the processor 112 to store various information associated with an operation of the processor 112. The RF unit 116 is connected to the processor 112 to transmit and/or receive a radio signal. The terminal 120 includes a processor 122, a memory 124, and an RF unit 126. The processor 122 may be configured to implement a procedure and/or a method proposed by the present invention. The memory 124 is connected to the processor 122 to store various information associated with an operation of the processor 122. The RF unit 126 is connected to the processor 122 to transmit and/or receive a radio signal. The base station 110 and/or the terminal 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some elements or features of any one embodiment may be included in another embodiment and may be replaced with corresponding elements or features of another embodiment. It is obvious to those skilled in the art that claims that are not explicitly cited in each other in the appended claims may be presented in combination as an embodiment of the present invention or included as a new claim by subsequent amendment after the application is filed.

A particular operation described as being performed by a base station in this document may be performed by an upper node thereof in some cases. In other words, it is obvious that various operations performed for communication with a terminal in a network which includes a plurality of network nodes including a base station may be performed by the base station or other network nodes other than the base station. The term "base station" may be replaced by the terms fixed station, Node B, eNode B (eNB), an AP, etc.

The embodiments of the present invention may be achieved by various means, for example, hardware, firmware, software, or a combination thereof. In a hardware configuration, an embodiment of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. performing a function or an operation described above. Software code may be stored in a memory unit and executed by a processor.

The memory unit may be located inside of the processor or outside thereof to transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication device such as a terminal, a relay, a base station, etc.

The invention claimed is:

1. A method of receiving a synchronization signal by a terminal in a wireless communication system, the method comprising:
   receiving location information on a domain, through which the synchronization signal is transmitted, among domains obtained by dividing a whole system bandwidth into N parts along a frequency axis and into M parts along a time axis; and
   receiving the synchronization signal through the domain corresponding to the location information,
   wherein the numbers N and M are natural numbers and the number N is determined based on a value obtained by normalizing transmission power of a base station connected to the terminal.

2. The method according to claim 1, wherein synchronization signals transmitted from different base stations are transmitted through domains having different frequency and time resources.

3. The method according to claim 1, wherein synchronization signals transmitted from base stations which provide different types of services are transmitted through domains having different frequency and time resources.

4. The method according to claim 1, wherein the number N is set to a maximum size of fast Fourier transform (FFT).

5. The method according to claim 1, wherein the number N is set to the number of subcarriers included in the whole system bandwidth.

6. A method of transmitting a synchronization signal by a base station in a wireless communication system, the method comprising:
- transmitting location information on a domain, through which the synchronization signal is transmitted, among domains obtained by dividing a whole system bandwidth into N parts along a frequency axis and into M parts along a time axis; and
- transmitting the synchronization signal through the domain corresponding to the location information,
- wherein the numbers N and M are natural numbers and the number N is determined based on a value obtained by normalizing transmission power of a base station connected to the terminal.

7. The method according to claim 6, wherein synchronization signals transmitted from different base stations are transmitted through domains having different frequency and time resources.

8. The method according to claim 6, wherein synchronization signals transmitted from base stations which provide different types of services are transmitted through domains having different frequency and time resources.

9. The method according to claim 6, wherein the number N is set to a maximum size of FFT.

10. The method according to claim 6, wherein the number N is set to the number of subcarriers included in the whole system bandwidth.

11. A terminal receiving a synchronization signal in a wireless communication system, the terminal comprising:
- a radio frequency (RF) unit; and
- a processor,
- wherein the processor is configured to control the RF unit to receive location information on a domain, through which the synchronization signal is transmitted, among domains obtained by dividing a whole system bandwidth into N parts along a frequency axis and into M parts along a time axis, and receive the synchronization signal through the domain corresponding to the location information,
- wherein the numbers N and M are natural numbers and the number N is determined based on a value obtained by normalizing transmission power of a base station connected to the terminal.

12. A base station transmitting a synchronization signal in a wireless communication system, the base station comprising:
- an radio frequency (RF) unit; and
- a processor,
- wherein the processor is configured to control the RF unit to transmit location information on a domain, through which the synchronization signal is transmitted, among domains obtained by dividing a whole system bandwidth into N parts along a frequency axis and into M parts along a time axis, and transmit the synchronization signal through the domain corresponding to the location information,
- wherein the numbers N and M are natural numbers and the number N is determined based on a value obtained by normalizing transmission power of a base station connected to the terminal.

* * * * *